United States Patent [19]

Berg

[11] Patent Number: 4,850,632
[45] Date of Patent: Jul. 25, 1989

[54] IMPROVEMENT IN PLATFORM STANCHION WITH CANVAS-COVER SUPPORTING POST

[75] Inventor: Lars O. Berg, Billdal, Sweden

[73] Assignee: Armaton AB, Sweden

[21] Appl. No.: 116,700

[22] Filed: Nov. 4, 1987

[30] Foreign Application Priority Data

Nov. 4, 1986 [SE] Sweden .................................. 8604708

[51] Int. Cl.$^4$ ............................................ B62D 25/00
[52] U.S. Cl. ........................................ 296/36; 296/43; 105/380
[58] Field of Search ....................... 296/36, 43; 403/61, 403/121; 119/147 R; 105/380, 381, 382, 384, 386; 248/511, 514, 520, 528

[56] References Cited

U.S. PATENT DOCUMENTS

| 1,041,147 | 10/1912 | Murphy | 403/61 |
| 3,558,182 | 1/1971 | Rosen | 296/36 |
| 3,627,375 | 12/1971 | Rosen | 296/36 |
| 3,977,717 | 8/1976 | Hassell | 105/384 |

FOREIGN PATENT DOCUMENTS 2233779 1/1974 Fed. Rep. of Germany ...... 105/384

Primary Examiner—Dennis H. Pedder
Assistant Examiner—John M. Gruber
Attorney, Agent, or Firm—Finnegan, Henderson, Farabow, Garrett & Dunner

[57] ABSTRACT

A platform stanchion (13) easily lockable to the edge of the platform (10) of a truck has a canvas-cover supporting post (17) consisting of an upper pole (26) and a lower U-section (25) connected thereto. The stanchion (13) engages with the post (17) by means of a tapered upper portion (23) with a tongue at its top. For receiving the upper portion (23) of the stanchion, the U-section (25) of the post (17) has a mating tapered recess with an opening at the top for receiving the tongue. The stanchion (13) and the post (17) can be pivoted inwards and outwards relative to each other with the tongue located in the opening of the U-section serving as pivotal center. In the swung-in position with the stanchion (13) and the post (17) aligned with each other, the stanchion is accommodated in the U-section of the post. Holes (33) provided in the flanges of the U-section are then located opposite the catches (15) which can be pivoted out of the stanchion (13) for locking the platform sides, whereby the canvas-cover supporting post (17) and the platform sides can be locked at the same time by means of the catches.

4 Claims, 4 Drawing Sheets

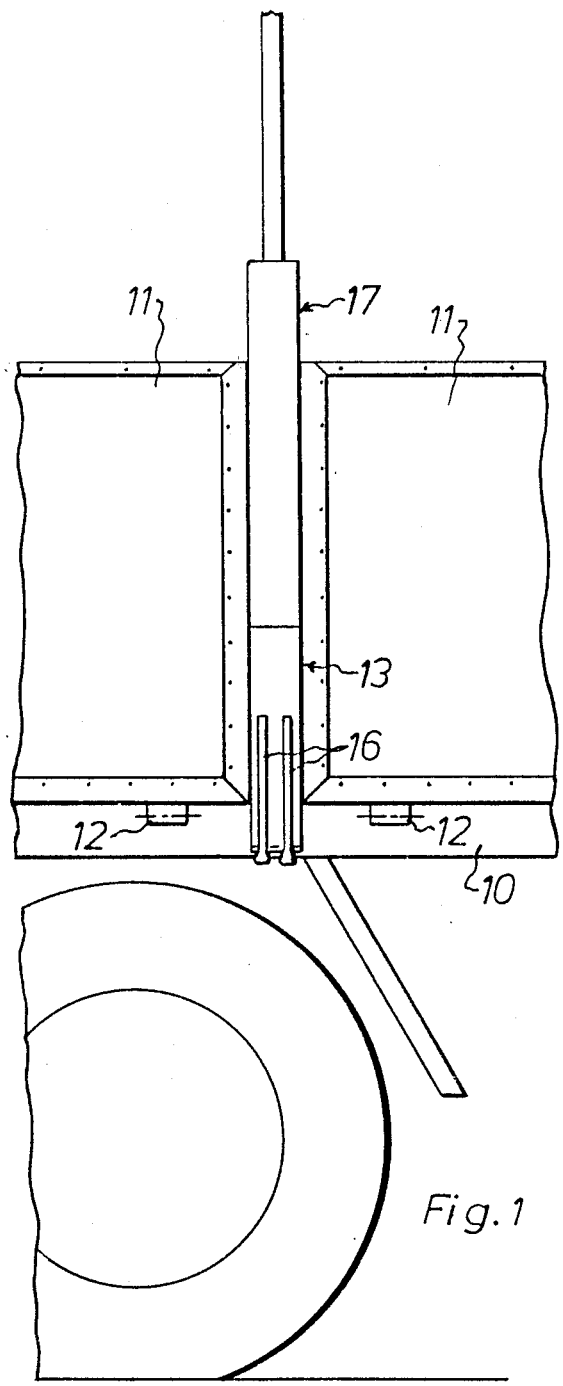
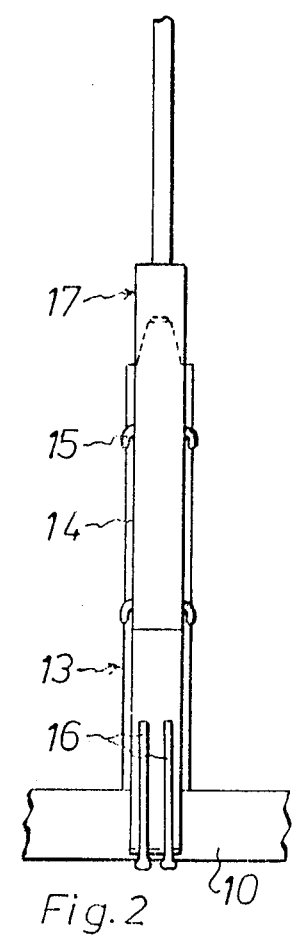
Fig. 1
Fig. 2

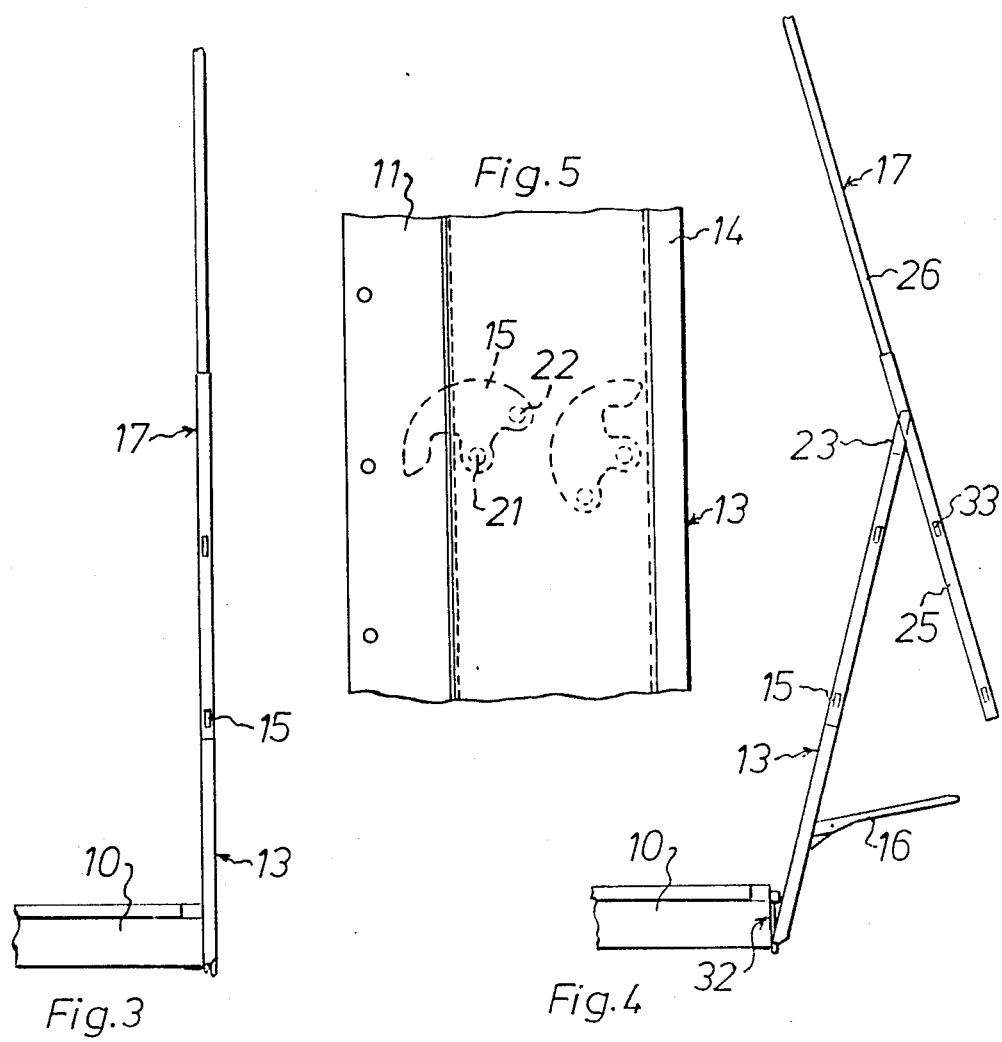
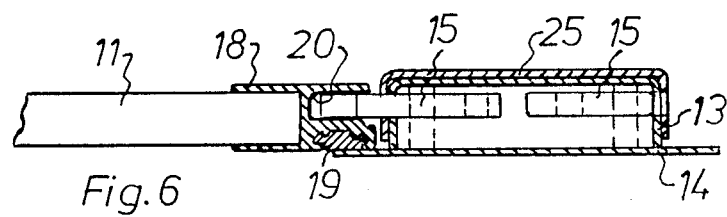

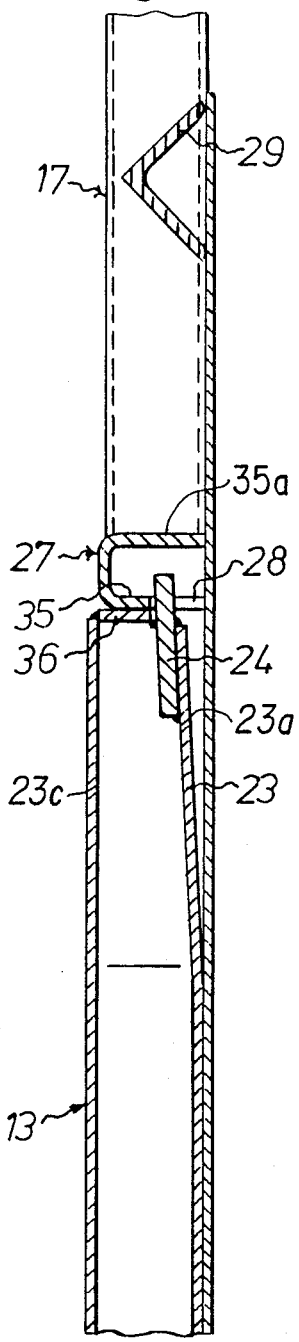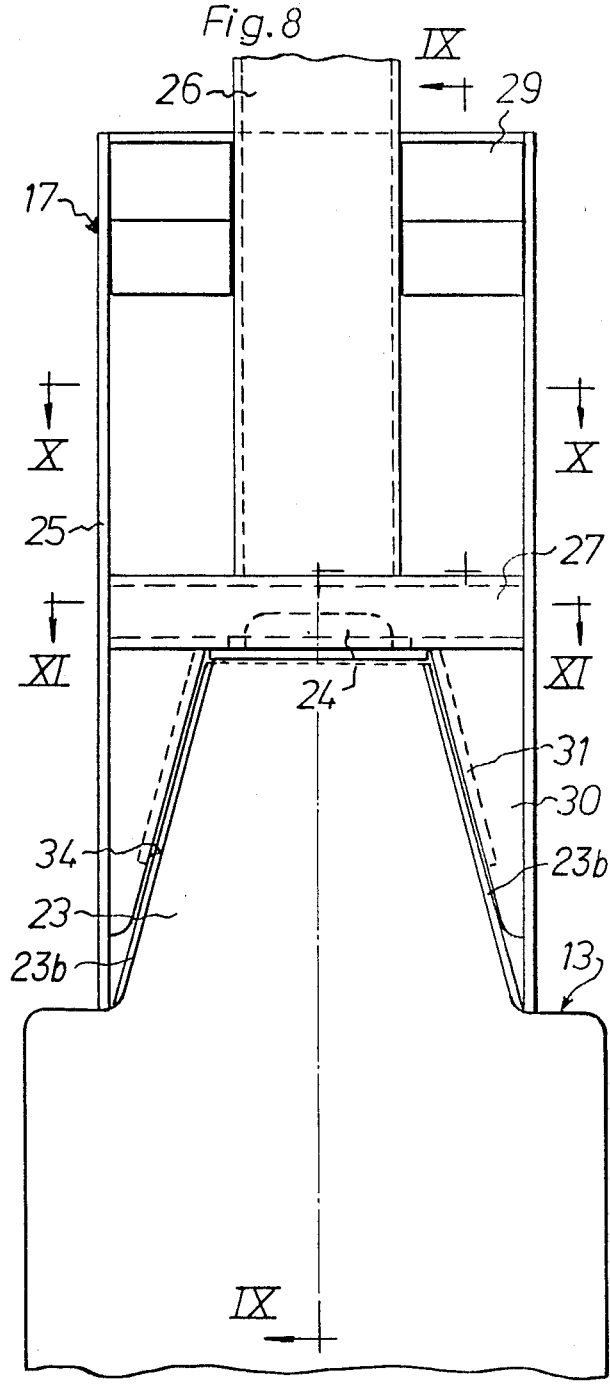

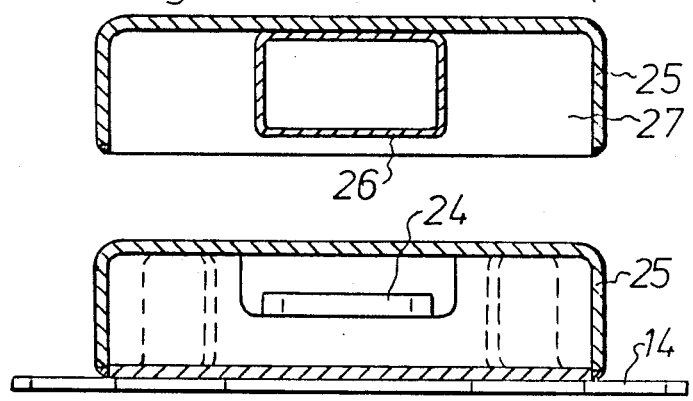
Fig.10
Fig.11
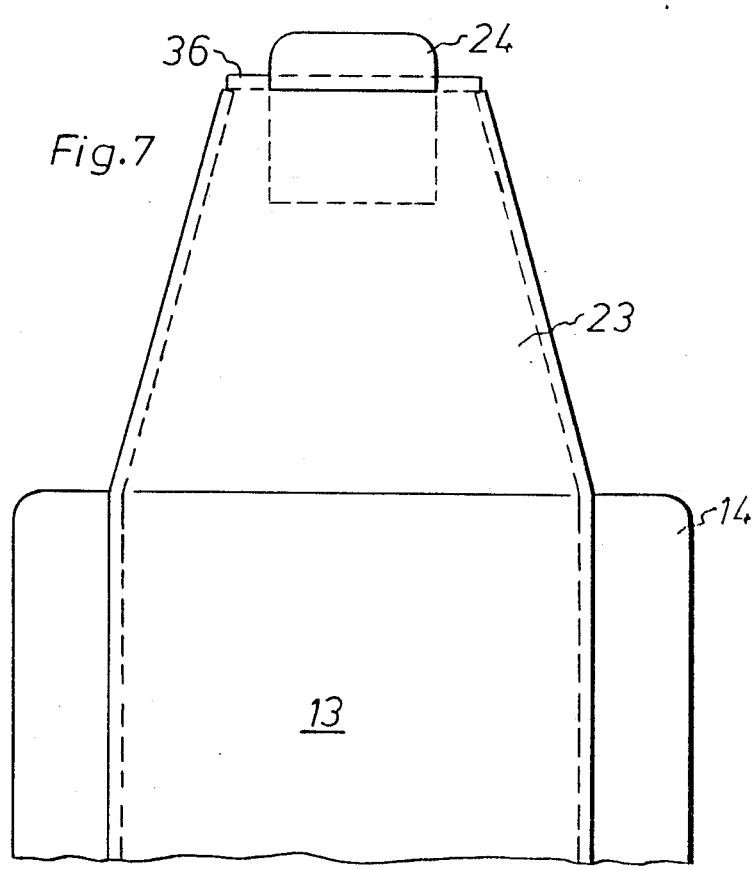
Fig.7

IMPROVEMENT IN PLATFORM STANCHION WITH CANVAS-COVER SUPPORTING POST

The present invention relates to an arrangement in a platform stanchion for maintaining the platform sides of a truck in an upright position of use, said stanchion having a canvas-cover supporting post extending upwards therefrom, said stanchion being pivotally and detachably connected at its lower end to a stanchion attachment mounted on the edge of the platform, and at its upper end to said post and having catches pivotal out of opposite side edges thereof and adapted to engage in locking recesses provided in the short side surfaces of the platform sides for locking said platform sides in said position of use.

In the use of platform stanchions and canvascover supporting posts in trucks, it is desirable to be able to rapidly and conveniently mount and dismount these elements in connection with loading and unloading of the truck. To this end, different types of stanchions and posts have been proposed, as well as different arrangements for interconnecting the stanchion and the post. In one prior art arrangement of this type, the stanchion has a bearing member pivotally engaging with a bearing structure on the post and guided to and from this bearing structure by means of a special guideway, so that the post can be raised and lowered in relation to the platform and the stanchion mounted thereon. This construction is however relatively sensitive and easily damaged by the rough handling to which said components are generally subjected. Also, it is difficult to anchor the canvascover supporting post in an upright position.

The object of the present invention thus is to provide a new and more robust arrangement for connecting a stanchion and a canvas-cover supporting post to each other, which primarily should be easily operated and easy to lock in the position of use.

According to the invention, this object is achieved in that the canvas-cover supporting post comprises, rigidly connected thereto, at least one downwardly directed bracing element having engagement means which, after said stanchion and said post have been pivoted to said position of use, are located opposite the catches of the stanchion and with which said catches engage for locking the platform sides.

The arrangement of the platform stanchion and the canvas-cover supporting post provides for rapid locking and unlocking of the latter by a simple handle movement and pivoting of the parts. Since the catches are also used for locking the canvas-cover supporting post, no separate locking device is required therefor. The robust connection between the stanchion and the post is achieved in that the stanchion comprises at its upper end an upwardly tapering portion which is adapted to engage with a mating upwardly tapering recess provided in said lower part of the post, and which is provided at the top with an upwardly directed locking tongue insertible in an opening in a wall defining at the top said tapering recess of the post.

The invention will be described in more detail hereinbelow with reference to the accompanying drawings, in which:

FIG. 1 is a side view of a portion of the platform of a truck having platform sides and a stanchion with a canvas-cover supporting post;

FIG. 2, corresponding to FIG. 1, shows the platform stanchion and the post with the platform sides removed;

FIG. 3 shows the stanchion and the post in an upright position of use in the longitudinal direction of the platform;

FIG. 4 is a similar view showing these parts when pivoted outwards;

FIG. 5 shows the catches on the stanchion for locking the platform sides 11;

FIG. 6 shows the arrangement of FIG. 5 in cross-section;

FIG. 7 shows the upper part of the stanchion from in front;

FIG. 8 is a sectional view showing the upper part of the stanchion when engaging the canvas-cover supporting post;

FIG. 9 is a section taken along the line IX—IX in FIG. 8;

FIG. 10 is a cross-section taken along the line X—X in FIG. 8; and

FIG. 11 is a cross-section taken along the line XI—XI in FIG. 8.

In FIG. 1, there is shown a portion of a truck platform 10, traditionally having platform sides 11 mounted on the platform edge by means of hinges 12. In order to hold the platform sides 11 in place, use is made of stanchions 13 consisting of a U-section to the flange ends of which is welded a planar plate 14 projecting from the flanges so as to form an abutment for the platform sides, as illustrated in FIGS. 2 and 6. An upper and a lower pair of catches 15 are mounted at 21 in each stanchion 13. The catches 15 can be pivoted from a position inside the stanchion out through openings in the stanchion sides by means of handles 16 acting on the catches 15 at 22 by means of a link mechanism (not shown). As shown in FIGS. 1 and 2, there are provided two handles 16 one of which is used for operating the catches 15 on one side of the stanchion 13 and the other for operating the catches 15 on the other side of the stanchion. The stanchion 13 is outwardly pivotally and detachably connected to the platform edge by means of an attachment 32 (FIG. 4) not shown in more detail, which may be of any suitable design allowing such movements. At its upper end, the stanchion 13 is connected to a canvas-cover supporting post 17, as will be described in more detail hereinbelow. Along their short sides, the platform sides 11 have, as seen in horizontal section, an approximately H-shaped section 18, preferably of aluminium. The short side of the platform sides 11 is accommodated between two opposed flanges of the H-section projecting in the same direction, while the other two flanges of the H-section define a slot 20 which extends along said section and into which the catches 15 can be pivoted for locking the platform sides 11 when in the raised position. As shown in FIG. 6, the section 18 is not completely symmetrical because one of the flanges defining the slot 20 is slightly offset inwards so as to permit receiving on its outer side a seal 19 engaging the edge area of the plate 14. A wear plate, e.g. of steel sheet, is mounted in the slot 20.

At the top, the stanchion 13 has an upper tapered section 23 defined by an outer wall 23a sloping upwards and inwards, two side walls 23b sloping inwards and an inner vertical wall 23c, all slopes being with respect to the longitudinal axis of the stanchion. The portion 23 is defined at the top by a wall 36 having a narrow slot through which extends a locking tongue 24 fixed to the inner side of the outer wall, as appears from FIGS. 7 and 9. The canvas-cover supporting post 17 consists of a lower channel section 25, of U-shaped cross-section, which is connected at its upper end to a pole 26, preferably in the form of a rectangular tube. Adjacent its end connected to the tube 26, the U-section has a crosspiece 27, also in the form of a U-section channel, or, which is fixed between the flanges of the U-section 25 with its flange ends welded to the web of the U-section 25, as shown in FIG. 9. The crosspiece 27 has a lower wall 35 which is formed by one of its flanges and has an opening 28 which extends upwardly to an upper wall 35a for a distance slightly exceeding the length of the tongue 24 extending upwardly into the opening 28. Since the tongue 24 is fixed to the inclined front wall of the tapered portion 23, it is located at a distance, determined by the degree of inclination, from the inner side of the web of the U-section 25, as shown in FIG. 9, and the opening 28 therefore has a width considerably exceeding the thickness of the tongue 24. The tongue 24 projects a predetermined distance into the crosspiece 27 for reasons indicated below. In order to reinforce the engagement between the rectangular tube 26 and the U-section 25, a pair of angle-irons 29 are welded between the tube 26 and the flanges of the U-section. The tube 26 is also welded to the web of the U-section and to the crosspiece 27. To permit receiving the tapered portion 23 of the stanchion, there is provided underneath the crosspiece 27 a mating recess defined by two triangular pieces 30 welded to each one of the U-section 25 and the crosspiece 27 in spaced-apart relationship and at right angles to the drawing plane of FIG. 8. An intermediate piece 31 is mounted between the triangular pieces on each flange. Thus, the tapering opening 34 for receiving the upper tapered portion 23 of the stanchion is defined between the pairs of triangular pieces 30 with the intermediate piece 31 and the lower wall of the crosspiece 27.

When using a stanchion with a canvas-cover supporting post according to the invention, it is proceeded as follows. First, the stanchion 13 is hooked in its outwardly pivoted position in the attachment 32, as shown in FIG. 4, whereupon the post 17 is hooked on the stanchion 13, which is easily done since the tapered portion 23 will automatically assume the correct position in the recess 34 of the U-section 25 of the post 17. Thus, the locking tongue 24 enters into the opening 28 in the bottom wall 35 of the crosspiece 27. The post 17 may of course also be hooked on the stanchion 13 before this is hooked in the attachment 32 on the platform edge. The stanchion with the post is thereafter pivoted, with the handles 16 swung out, towards the vertical position of use while the U-section 25 is simultaneously pivoted against the upper portion of the stanchion, which can be easily done since the U-section has a substantial length counting from the bearing. In the vertical position of the stanchion and the post, in which the upper portion of the stanchion 13 is accommodated in the space defined by the web and the flanges of the U-section 25, as appears from FIG. 6, and the openings 33 provided in the flanges of the U-section are located opposite the catches 15 in the stanchion, one handle 16 is lowered, whereupon the catches 15 are pivoted outwards and the parts are locked in a position of alignment with each other. Then, the platform side with which the other handle 16 is associated, can be raised into abutment against the plate 14 and locked by lowering this handle. At the same time, the stanchion and the post are also locked and so, the first-mentioned handle 16 can be swung out so that the other platform side can also be raised and locked together with the U-flange on this side. When the stanchion and the post are pivoted inwards to the position of use, the tongue 24 on the stanchion 13 moves towards the rear edge of the opening 28, and when the platform sides 11 are raised and the stanchion 13 and the post 17 are aligned with each other in the upright position, as indicated in FIG. 9, the edge of the opening 28 abuts against the surface of the locking tongue 24 facing the platform. When the handles 16 are lowered, a locking bolt (not shown) is also actuated so as to engage with the attachment 32 on the platform edge. Thus, by a single manual operation, it is possible to lock the stanchion, the platform sides and the canvas cover-supporting post in place.

For unlocking the post 17 and the stanchion 13, the reverse procedure is adopted. One or both of the handles 16 are swung up to the position shown in FIG. 4, whereby the platform sides 11 are released and the stanchion 13 and the post 17 can be pivoted outwards. The locking tongue 24 then moves to the right in relation to the opening in FIG. 9, while the walls 35 and 36 bear against each other. The tongue 24 extends upwards from the wall 36 by such a length that the canvas-cover supporting post 17 can easily be detached after the stanchion and the post have been pivoted to their outermost position.

Several of the components used may of course be modified in various ways without departing from the inventive concept. In the accompanying claims, mention is made of catches since use is practically unexceptionally made of at least two such catches for locking the platform sides, but if use is made of but a single locking catch or the like, optionally of a special design, the invention is also applicable in such a case, the decisive thing being that the stanchion and, hence, the canvas cover-supporting post be safely anchored when locking the platform sides.

I claim:
1. A platform stanchion structure adapted to be disposed between the platform panels of a truck platform to hold said panels in an upright position of use, said panels having opposed inner and outer faces extending along an edge of the platform and short faces connecting the inner and outer faces, comprising
   (a) a stanchion having a lower end and an upper end;
   (b) a stanchion attachment mounted on the edge of the platform and adapted to pivotally and detachably connect the lower end of the stanchion to the edge of the platform;
   (c) locking recesses in the short faces of the platform panels;
   (d) catches pivotally mounted in the stanchion for movement out of and into the stanchion to engage in and, respectively, out of the locking recesses when the panels are in an upright position;
   (e) a supporting post comprising an elongated lower channel section having a web and flanges, and an upper pole section rigidly connected to the upper end of the channel section;
   (f) a crosspiece in the channel section, which is connected with the inside of the web and flanges adjacent the connection of the channel section to the pole section, and which is provided with an opening extending therethrough adapted to pivotally receive the stanchion's upper end when inserted in the channel section, such that the post and the stanchion are mutually pivotal between a position in which they form an angle with each other, and a position in which they are aligned with each other and the stanchion is located inside the channel section; and (g) through-holes formed in the channel section flanges and located directly opposite said catches of the stanchion, and said catches being movable through said through-holes to engage in the locking recesses in said short faces of the platform panels.

2. The structure of claim 1, wherein said stanchion is provided at its upper end with an upwardly tapering portion, said channel section is provided with an upwardly tapering recess adapted to engage with the upwardly tapering portion of the stanchion, and the crosspiece is located at the top of the tapering recess, the upwardly tapering portion of the stanchion being provided at the top thereof with an upwardly directed locking tongue insertable in the opening in the crosspiece.

3. The structure of claim 2, wherein the tapering portion of the stanchion has two side walls upwardly inclined towards each other, an outer wall remote from the platform and inclined upwardly-inwardly, a wall adjacent the platform, and a top wall from which the tongue extends upwardly, wherein the cross-piece is a channel extending between the flanges of the channel section and having an upper and a lower wall, the lower wall defining the top of the tapering recess in the channel section and the lower wall having an opening therein for receiving the tongue, the opening having an inner edge abutting against the inner side of the upwardly extending tongue when the channel section has been pivoted so as to place the upper portion of the stanchion inside the channel section, and wherein the distance between the upper and lower walls of said channel exceeds the height of the tongue extending upwardly therein.

4. The structure of claim 1, wherein said stanchion is provided with spaced-apart upper and lower pairs of said catches and said channel section is provided with an upper and a lower pair of openings in each flange opposite each of said catches and said channel section extends downwardly beyond said lower catches when the channel section is pivoted to place the upper portion of the stanchion inside the channel section.

* * * * *